United States Patent
Lee et al.

(10) Patent No.: US 10,031,710 B2
(45) Date of Patent: Jul. 24, 2018

(54) DISPLAY DEVICE CONSTITUTING MULTI-DISPLAY SYSTEM AND CONTROL METHOD THEREOF

(71) Applicant: Samsung Electronics Co., Ltd., Suwon-si, Gyeonggi-do (KR)

(72) Inventors: Chang-won Lee, Incheon (KR); Hee-young Kang, Suwon-si (KR)

(73) Assignee: SAMSUNG ELECTRONICS CO., LTD., Suwon-si (KR)

(*) Notice: Subject to any disclaimer, the term of this patent is extended or adjusted under 35 U.S.C. 154(b) by 278 days.

(21) Appl. No.: 14/962,561

(22) Filed: Dec. 8, 2015

(65) Prior Publication Data

US 2016/0188278 A1    Jun. 30, 2016

(30) Foreign Application Priority Data

Dec. 26, 2014  (KR) .................. 10-2014-0190624

(51) Int. Cl.
| | | |
|---|---|---|
| *G09G 5/00* | (2006.01) | |
| *G06F 3/14* | (2006.01) | |
| *G09G 5/02* | (2006.01) | |
| *G09G 5/391* | (2006.01) | |

(52) U.S. Cl.
CPC .......... *G06F 3/1446* (2013.01); *G09G 5/026* (2013.01); *G09G 5/391* (2013.01); *G09G 2330/022* (2013.01); *G09G 2330/026* (2013.01); *G09G 2340/045* (2013.01); *G09G 2340/0442* (2013.01); *G09G 2340/14* (2013.01); *G09G 2370/10* (2013.01); *G09G 2370/12* (2013.01); *G09G 2370/22* (2013.01)

(58) Field of Classification Search
CPC ...... G06F 3/1446; G09G 5/026; G09G 5/391; G09G 2330/022; G09G 2330/026; G09G 2340/0442; G09G 2340/045; G09G 2340/14; G09G 2370/10; G09G 2370/12; G09G 2370/22
See application file for complete search history.

(56) References Cited

U.S. PATENT DOCUMENTS

| | | | | |
|---|---|---|---|---|
| 2005/0134526 | A1* | 6/2005 | Willem | ............... G06F 3/1446 345/1.3 |
| 2013/0038508 | A1* | 2/2013 | Min | ............... H04N 21/43635 345/1.1 |
| 2013/0215041 | A1* | 8/2013 | Kim | ............... G06F 3/0487 345/173 |
| 2017/0084246 | A1* | 3/2017 | Joshi | ............... G06F 3/1446 |

* cited by examiner

*Primary Examiner* — Peter D McLoone
(74) *Attorney, Agent, or Firm* — Staas & Halsey LLP

(57) ABSTRACT

A display device constituting a multi-display system is provided, which includes an input connector configured to receive an input image; a main processor configured to process an image corresponding to a display device from an input image; a display configured to display a processed image; an output connector configured to transmit an input image to an adjacent display device connected to a display device; and a sub-processor configured to transmit, when a display device wakes up, a booting command to a main processor, transmit a wakeup signal to an adjacent display device, extract information that is necessary for image processing from an input image, and then transmit an input image to a main processor.

16 Claims, 10 Drawing Sheets

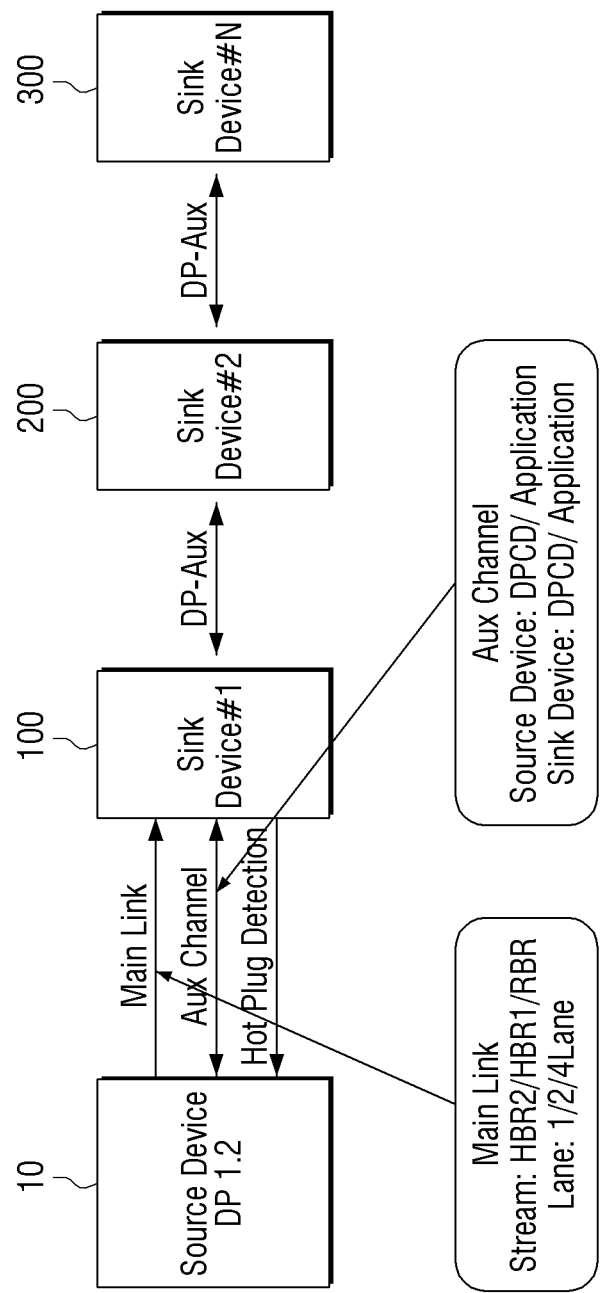

DISPLAY DEVICE CONSTITUTING MULTI-DISPLAY SYSTEM AND CONTROL METHOD THEREOF

CROSS-REFERENCE TO RELATED APPLICATIONS

This application claims priority from Korean Patent Application No. 10-2014-0190624 filed on Dec. 26, 2014 in the Korean Intellectual Property Office, the disclosure of which is incorporated herein by reference in its entirety.

BACKGROUND

1. Field

The present disclosure relates to a display device and a control method thereof, and more particularly, to a display device constituting a multi-display system and a control method thereof.

2. Description of the Related Art

In general, a display device is a device that displays one or more images on one screen. However, a user may perform a multi-display function to display an image on a plurality of screens using a plurality of display devices. A representative example of such a multi-display system may be a video wall system.

A video wall is provided by arranging a plurality of display devices that can output images on plane and making the plurality of display devices output respective parts of one image, and thus the plurality of display devices act as one display device having a large screen. For example, the video wall operates in a manner that the respective display devices that constitute the video wall in an exhibition hall or the like simultaneously display the same image or display different images that are combined into a whole image.

The plurality of display devices that constitute the multi-display system as described above are connected to a source device. The source device is a device that supplies video sources to be output to the plurality of display devices, and is configured to control display states of the respective display devices. Accordingly, a user can control the plurality of display devices using the source device.

In this case, however, the video sources are sequentially supplied to the plurality of display devices that are connected in series to the source device. The multi-display system in the related art has the drawbacks that wakeup time of the respective display devices is delayed when transmitting A/V stream packets after link training, and thus there exist limitations in performing high-speed wakeup and rapid image display.

Accordingly, there has been a need for schemes to implement high-speed wakeup of a plurality of display devices that constitute a multi-display system.

SUMMARY

Additional aspects and/or advantages will be set forth in part in the description which follows and, in part, will be apparent from the description, or may be learned by practice of the embodiments.

Exemplary embodiments of the present disclosure overcome the above disadvantages and other disadvantages not described above, and provide a display device and a control method thereof, which can minimize delay of wakeup time of a multi-display system.

According to an aspect of the present disclosure, a display device constituting a multi-display system includes an input connector configured to receive an input image; a main processor configured to process an image corresponding to the display device from the input image; a display configured to display the processed image; an output connector configured to transmit the input image to an adjacent display device connected to the display device; and a sub-processor configured to transmit, when the display device wakes up, a booting command to the main processor, transmit a wakeup signal to the adjacent display device, extract information that is necessary for image processing from the input image, and then transmit the input image to the main processor.

The sub-processor may extract the information that is necessary for the image processing by de-packaging and parsing the input image, transmit, if the parsing is completed, the parsed image to the main processor, repackage the parsed image, and transmit the repackaged image to the adjacent display device.

The sub-processor may convert the input image into a DP (Display Port) format and transmit the converted image to the adjacent display device.

The input connector may include an input connector of at least one of DP (Display Port), DVI (Digital Visual Interface), and HDMI (High Definition Multimedia Interface) types.

The input connector may receive the image from the source device or the adjacent display device connected through the input connector, and the sub-processor may exchange data for link management of the multi-display system and for control of a plurality of display devices constituting the multi-display system with the source device or the connected adjacent display device through an auxiliary channel.

The wakeup of the display device may be performed in at least one of a case where the wakeup signal is received through the input connector, a case where an AC power is input, a case where resolution of an input source is controlled, a case where the input source is changed, and a case where a DPMS (Digital Power Management Signaling) mode is released.

The sub-processor may operate to enter into a panel-off mode to turn off only the display if a preset time elapses in a state where the display device has no input.

The sub-processor may transmit a command for making the display device operate in the panel-off mode to the main processor if a preset time elapses in a state where the display device has no input in the case where the DPMS mode is in an inactivated state.

The main processor may generate the corresponding image in a manner that the main processor crops the input image into a plurality of image portions in accordance with the number of display devices constituting the multi-display system, and scales the cropped image portions corresponding to resolution of the display device.

According to another aspect of the present disclosure, a method for controlling a display device constituting a multi-display system includes a sub-processor transmitting, when the display device wakes up, a booting command to a main processor and transmitting a wakeup signal to an adjacent display device; the sub-processor extracting information that is necessary for image processing from an input image and transmitting the input image to the main processor; and the main processor processing, when booting of the main processor is completed according to the booting command, an image corresponding to the display device from the input image and displaying the processed image.

The transmitting the input image to the main processor may include extracting the information that is necessary for the image processing by de-packaging and parsing the input image and transmitting, if the parsing is completed, the parsed image to the main processor; and repackaging the parsed image and transmitting the repackaged image to the adjacent display device.

The method for controlling a display device according to the aspect of the present disclosure may further include converting the input image into a DP (Display Port) format and transmitting the converted image to the adjacent display device.

The input image may be input through an input connector of at least one of DP (Display Port), DVI (Digital Visual Interface), and HDMI (High Definition Multimedia Interface) types.

The image may be input from a source device or the adjacent display device connected to an input connector, and the method for controlling a display device according to the aspect of the present disclosure may further include exchanging data for link management of the multi-display system and for control of a plurality of display devices constituting the multi-display system with the source device or the connected adjacent display device through an auxiliary channel.

The wakeup of the display device may be performed in at least one of a case where the wakeup signal is received through the input connector, a case where an AC power is input, a case where resolution of an input source is controlled, a case where the input source is changed, and a case where a DPMS (Digital Power Management Signaling) mode is released.

The method for controlling a display device according to the aspect of the present disclosure may further include entering into a panel-off mode to turn off only the display if a preset time elapses in a state where the display device has no input.

The entering into the panel-off mode may include transmitting a command for making the display device operate in the panel-off mode to the main processor if a preset time elapses in a state where the display device has no input in the case where the DPMS mode is in an inactivated state.

The processing and displaying the corresponding image may include processing the corresponding image by cropping the input image into a plurality of image portions in accordance with the number of display devices constituting the multi-display system and scaling the cropped image portions corresponding to resolution of the display device.

According to another aspect of the present disclosure, a method for controlling a display system of a multi-display system includes transmitting, by a first processor, a booting command to a second processor and transmitting a wakeup signal to an adjacent display system, extracting, by the first processor, information for image processing from an input image and transmitting the input image to the second processor, and processing and displaying the input image, by the second processor, responsive to the information when booting of the second processor is complete.

According to the various exemplary embodiments of the present disclosure, rapid display can be implemented by waking up the display device constituting the multi-display system at high speed, and thus user's convenience can be improved.

Additional and/or other aspects and advantages of the disclosure will be set forth in part in the description which follows and, in part, will be obvious from the description, or may be learned by practice of the disclosure.

BRIEF DESCRIPTION OF THE DRAWINGS

The above and/or other aspects of the present disclosure will be more apparent by describing certain exemplary embodiments of the present disclosure with reference to the accompanying drawings, in which:

FIG. 4 is a diagram explaining a process in which a sub-processor exchanges data through an auxiliary channel according to an exemplary embodiment of the present disclosure;

DETAILED DESCRIPTION

Figure 1:
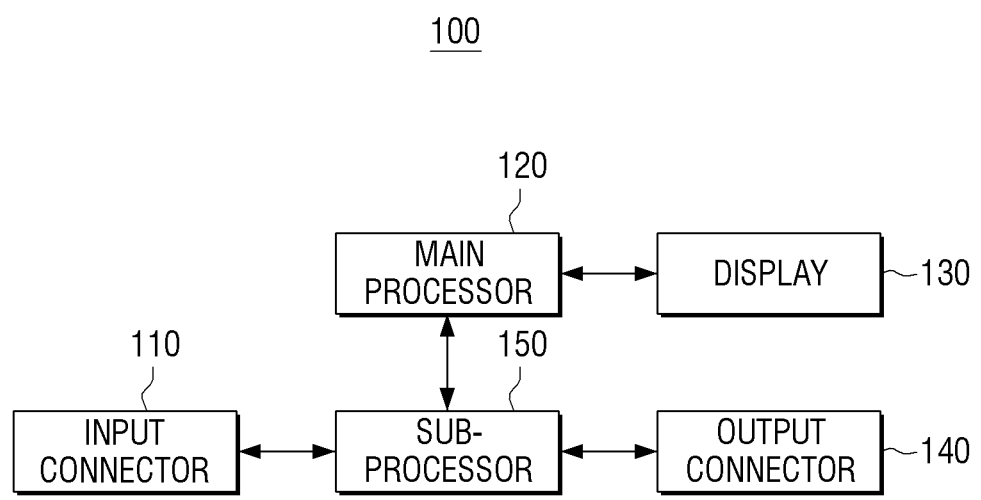
FIG. 1 is a block diagram schematically illustrating the configuration of a display device constituting a multi-display system according to an exemplary embodiment of the present disclosure.

Reference will now be made in detail to the embodiments, examples of which are illustrated in the accompanying drawings, wherein like reference numerals refer to the like elements throughout. The embodiments are described below to explain the present embodiments by referring to the figures.

The exemplary embodiments of the present disclosure may be diversely modified. Accordingly, specific exemplary embodiments are illustrated in the drawings and are described in detail in the detailed description. However, it is to be understood that the present disclosure is not limited to a specific exemplary embodiment, but includes all modifications, equivalents, and substitutions without departing from the scope and spirit of the present disclosure. Also, well-known functions or constructions are not described in detail since they would obscure the disclosure with unnecessary detail.

Hereinafter, exemplary embodiments of the present disclosure will be described in detail with reference to the accompanying drawings.

FIG. 1 is a block diagram schematically illustrating the configuration of a display device constituting a multi-display system according to an exemplary embodiment of the present disclosure.

Referring to FIG. 1, a display device 100 according to an exemplary embodiment of the present disclosure includes an input connector 110, a main processor 120, a display 130, an output connector 140, and a sub-processor 150.

The input connector 110 is configured to receive an input image signal from an adjacent display device or a source device. Here, the input connector 110 may include a plurality of ports for receiving an input image signal, such as DVI (Digital Visual Interface), DP (Display Port), HDMI (High Definition Multimedia Interface), component, RS232C communication, and/or broadcasting signal receiver. Here, the source device is a device that can transmit image signals to respective display devices, and may include a PC (Personal Computer), a DVD player, a BD player, a PVR, an external server, and/or a web server.

The input connector 110 may separately include an input connector for controlling a display device in addition to the above-described input connector of the input image signal. Further, the input connector 110 may include a detection connector that can confirm a connection with a surrounding display device, and if necessary, the input connector 110 may further include various input connectors.

The main processor 120 is configured to control the whole operation of the display device 100. In particular, the main processor 120 may process an image corresponding to the display device from the input image.

The main processor 120 may generate a corresponding image in a manner that it crops the input image into a plurality of image portions in accordance with the number of display devices constituting the multi-display system, and scales the cropped image portions corresponding to resolution of the display device 120. Among the cropped image portions, the remaining image portions, which exclude the image portion to be output through the corresponding display device 100, are removed. The main processor 120 scales the cropped image portions with a size of inherent resolution of a display panel.

The display 130 is configured to display the image based on the image signal that is processed by the main processor 120. The display 130 may include various types of displays that can display images, such as a CRT (Cathode Ray Tube), an LCD (Liquid Crystal Display), an LED (Light Emitting Diode), and a PDP (Plasma Display Panel).

The output connector 140 is configured to transmit the image signal to an adjacent display device. Here, the output connector 140 may be implemented by a DP (Display Port) type connector having an auxiliary channel, but is not limited thereto. The output connector 140 may be implemented by various types of connectors including auxiliary channels.

The sub-processor 150 is configured to, in support of the main processor 120, extract necessary information from the input image and generate various auxiliary commands required to drive the main processor 120 and to control the display device 100.

In particular, when the display device 100 wakes up, the sub-processor 150 may transmit a booting command to the main processor 120, transmit a wakeup signal to an adjacent display device, extract the information that is necessary for image processing from the input image, and then transmit the input image to the main processor 120.

Here, the term "wake up" means that a signal with a physical level is detected, and through this, the display device 100 can be switched from a standby state to a minimum operating state. For example, if the input image is received through the input connector 110 or the wakeup signal is received from the adjacent display device, the display device 100 that is in a standby state may be switched over to an operating state.

Thereafter, the sub-processor 150 may transmit the wakeup signal to the adjacent display device, that is, the display device connected through the output connector, to make the corresponding adjacent display device switched over to the operating state, and may transmit the booting command to the main processor 120 at the same time. The booting command is a command for booting the main processor 120, that is, a command for making the main processor 120 process an image corresponding to the display device 100 from the input image. After transmitting the wakeup signal and the booting command, the sub-processor 150 may extract the information that is necessary for image processing from the input image, and transmit the input image to the main processor 120.

That is, the sub-processor 150 may transmit, simultaneously with waking up, the booting command to the main processor 120 in order to boot the main processor 120 in advance while processing the input image, and thus the booting time of the main processor 120 can be saved.

Specifically, the sub-processor 150 may extract the information that is necessary for the image processing by de-packaging and parsing the input image, transmit, if the parsing is completed, the parsed image to the main processor 120, repackage the parsed image, and transmit the repackaged image to the adjacent display device. Here, the information that is necessary for processing the parsed and extracted image may be, for example, information related to loop-out of the input image for a multi-display system, DP configuration information, resolution information, source information, frame information, or DP condition information. If the parsed image is repackaged, the sub-processor 150 transmits the repackaged image to the adjacent display device that is connected to the output connector of the display device 100.

Further, the sub-processor 150 may convert the input image into a DP format and transmit the converted image to the adjacent display device.

The DP is the next-generation display interface that is a connection format widely used in a PC, a monitor, a panel, a projector, or a high-resolution content application program. The DP uses a main link, an auxiliary channel, and a HPD (Hot Plug Detect) signal line, and enables the source device and a sink device to be physically connected to each other. In the present disclosure, the sink device corresponds to each display device constituting the multi-display system, and the details thereof will be described later.

On the other hand, the sub-processor 150 may exchange data for link management of the multi-display system and data for control of the plurality of display devices 100 constituting the multi-display system with the source device or the adjacent display device connected to the display device 100 through the auxiliary channel.

The auxiliary channel is a half-duplex bidirectional channel, and is composed of a differential pair. The auxiliary channel has a bandwidth of 1 Mbps, and is used to initialize and construct a link. Specifically, the auxiliary channel makes it possible to perform link management, control of the respective display devices, and bidirectional high-speed data transmission. The auxiliary channel can perform low-power data transmission and optimization of the data transmission through setting of a differential voltage width and optimization of an equalizer through a link training process, and can perform transmission of USB 2.0, CAM and interface unit, or control signals through one DP cable through the high-speed data transmission. The auxiliary channel may operate in the order of ① each display device confirmation state, ② a main link training state, ③ a main link normal operating state, ④ an auxiliary channel training state, and ⑤ an auxiliary channel normal operating state.

Here, the wakeup of the display device 100 may be performed in the case where the wakeup signal is received through the input connector, the resolution of the input source is controlled, the input source is changed, and a DPMS (Digital Power Management Signaling) mode is released. The DPMS mode means entering into a standby mode in which power consumption is minimized when the display device 100 is in a non-operating state. If a specific signal is received in the standby state, the standby mode is released, and the display device 100 wakes up to operate.

Further, if a predetermined time elapses in a state where the display device 100 has no input signal Sync, the sub-processor 150 may operate to enter into a panel-off mode for turning off only the display 130.

In general, if no signal is input for a predetermined time in the DPMS mode, the display device 100 automatically enters into the standby mode. If there is a large number of display devices that constitute the multi-display system (e.g., in a video wall system composed of 100 display devices), the respective display devices may have different reference times for entering into the DPMS mode when the multi-display system operates, and this may cause the multi-display system not to recognize the display devices that have entered into the DPMS mode. In this case, an image is input again from the source device, and if such a problem occurs repeatedly, it takes a long time for the multi-display system to normally operate. Accordingly, the display screen repeats on/off operation to cause inconvenience to a user.

Accordingly, the sub-processor 150 turns off only the display 130 of the display device 100 other than making the display device 100 enter into the DPMS mode, and thus the multi-display system can rapidly operate.

In this case, if a predetermined time elapses in a state where the display device 100 has not input signal in the case where the DPMS mode is inactivated, the sub-processor 150 may transmit a command for operating the display device 100 in the panel-off mode to the main processor 120. In this case, the sub-processor 150 turns off the DPMS mode of the display device 100, and transmits a command for operating the display 130 in the panel-off mode to the main processor 120 together with the above-described booting command.

Figure 2:
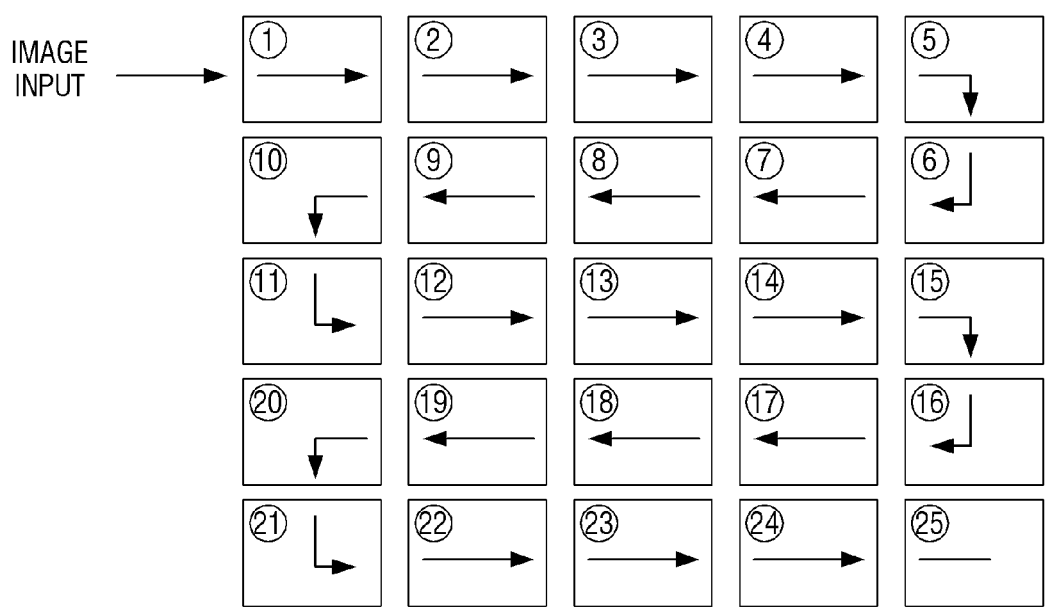
FIG. 2 is a view explaining a signal flow of a multi-display system according to an exemplary embodiment of the present disclosure.

FIG. 2 is a view explaining a signal flow of a multi-display system according to an exemplary embodiment of the present disclosure.

FIG. 2 illustrates, as an example of the multi-display system, a video wall system in which many display devices are piled up to form a large screen and various images are displayed on the large screen through reception of an image signal from the source device. Hereinafter, referring to FIGS. 2 to 7, a video wall system will be described as an example of the multi-display system. However, the present disclosure is not limitedly applied to the video wall system, but may be applied to various display systems that display one or a plurality of images using a plurality of display devices.

Referring to FIG. 2, in a video wall system including 5×5 display devices that are connected by pairs of input and output connectors, a first display device receives an image signal from a source device or the like. If the first display device has received the image signal, the image signal is output through the output connector that is located on the right side of the first display device, and is input through the input connector that is located on the left side of a second display device that is adjacent to the first display device.

Further, the image signal is output through the output connector that is located on the right side of the second display device, and is input to the input connector that is located on the left side of a third display device that is adjacent to the second display device. Accordingly, the respective display devices are connected in series through the pairs input and output connectors, and the image signal that is input to the first display device is transmitted up to a $25^{th}$ display device.

However, the signal flow illustrated in FIG. 2 is merely exemplary, and the image signal that is input to the first display device may be transmitted to the $25^{th}$ display device after passing through the $10^{th}$ display device, the $11^{th}$ display device, the $20^{th}$ display device, the $21^{st}$ display device, the $22^{nd}$ display device, and the $19^{th}$ display device in order.

Further, in this embodiment, the video wall system including a plurality of display devices may be implemented by various numbers of display devices, for example, 10×10 display devices, in addition to the 5×5 video wall system.

Figure 3:
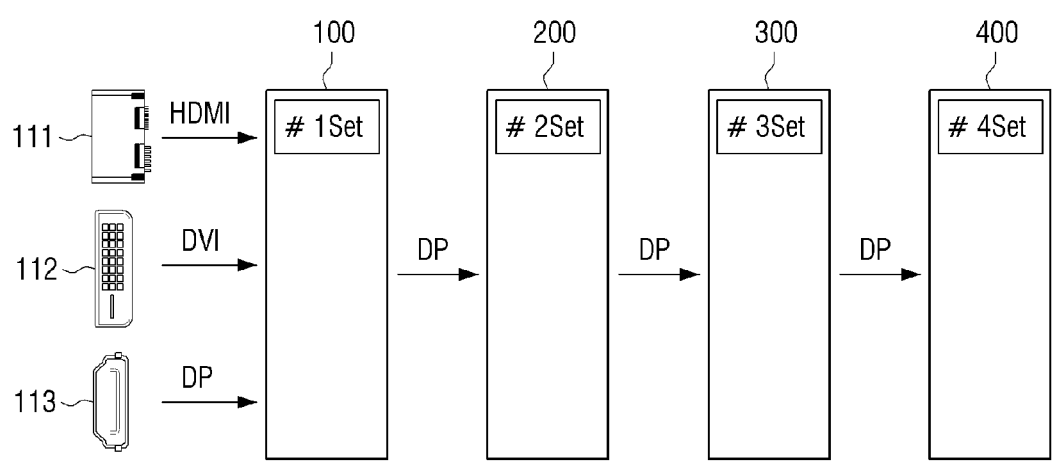
FIG. 3 is a diagram explaining a process of converting an input image into a DP format according to an exemplary embodiment of the present disclosure.

FIG. 3 is a diagram explaining a process of converting an input image into a DP format according to an exemplary embodiment of the present disclosure.

In FIG. 3, #1Set to #4Set indicate parts of a plurality of display devices that constitute a video wall system, and respective display devices 100 to 400 may sequentially receive, process, and output images. The respective display devices may include various types of input connectors, such as HDMI 111, DVI 112, and DP 113.

The display device 100 may receive various types of images that are input from a source device, convert the input images into a DP format, and transmit the converted images to an adjacent display device 200. Specifically, the sub-processor 150 may manage audio and video signals so that their types can be converted among HDMI, DVI, and DP, and for this, the sub-processor 150 may further include a DP conversion converter. Once the image is converted into the DP type, the converted image is sequentially transmitted to the display devices 300 and 400 connected to each other.

FIG. 4 is a diagram explaining a process in which a sub-processor exchanges data through an auxiliary channel according to an exemplary embodiment of the present disclosure.

FIG. 4 illustrates one embodiment in which a video wall system transfers images through DP type input and output connectors. Referring to FIG. 4, the DP uses a main link, an auxiliary channel, and a hot plug detection line in order to transfer an image and voice, and each display device of the video wall system corresponds to a sink device of FIG. 4.

The main link is a unidirectional high-speed channel for an isochronous stream transmitter as a main transfer channel of stream data. The main link may use one, two, or four lines, and is composed of a differential pair. The main link may have bit rates of 2.7 Gbps and 1.6 Gbps for each lane. In order to provide the isochronous stream transmitter service, the source device 10 converts the image and voice signals to be transferred through the main link into a specific format for reconstruction, and transfers the converted signals to the respective sink devices 100, 200, and 300.

The auxiliary channel provides a link service to construct and maintain the main link. Further, the auxiliary channel provides a service for grasping whether the respective sink devices 100, 200, and 300 can normally indicate data transmitted from the source device 10.

The HPD (Hot Plug Detection) line is a signal line for informing the source device 10 of connection of the sink devices 100, 200, and 300, and is used to confirm the connection among the respective sink devices 100, 200, and 300. The HPD signal informs the source device of an event, such as an IRQ (Interrupt Request), unplug, or plug/re-plug.

Here, the source device 10 becomes a master of the auxiliary channel, and the sink devices 100, 200, and 300 become slaves of the auxiliary channel. As a master, the source device 10 should initialize a request signal, and the respective sink devices 100, 200, and 300 may send a response signal according to the request signal. If the sink devices 100, 200, and 300 detect the HPD signal, the source device 10 should designate the auxiliary channel in an auxiliary standby state, and should make the sink devices 100, 200, and 300 put in a standby state.

Link layer services of the auxiliary channel include an auxiliary channel link service and an auxiliary channel device service. In order to manage links and devices between the source device 10 and the sink devices 100, 200, and 300, a polish maker may be used.

The operation of the auxiliary channel starts by the HPD signal, and the source device 10 can recognize that the sink devices 100, 200, and 300 are connected through receiving an input of the HPD signal. If it is confirmed that the sink devices 100, 200, and 300 are connected, the source device 10 read EDID information from the respective sink devices 100, 200, and 300 to initialize stream transmission, and can obtain link construction, performance of the respective sink devices 100, 200, and 300, and link state information.

If the stream data can be reproduced in the respective sink devices 100, 200, and 300 based on the EDID information and information about stream attribute data, the source device 10 starts link training by reading DPCD (Display Port Configuration Data). The link training means construction of the main link through transmission of a training pattern through a physical layer of the main link.

If the main link is normally constructed through the link training, the source device 10 transmits stream and attribute data to the sink device 10 through the main link. If the link training fails, the source device 10 may perform correction action.

The repeated work of the main link construction, training pattern transfer, and link state information checking may be ended as "pass" or "fail". The term "pass" means that a bit rock occurs on the constructed lane and inter-lane alignment and a symbol lock occur on all lanes, whereas the term "fail" means the opposite thereof.

After the main link is constructed, the source device 10 checks the link state whenever a HPD toggle occurs after a rising edge of the HPD. The source device 10 may confirm the state change of the sink device 10 by checking the DPCD link state region through an auxiliary channel read operation within 100 ms after the rising edge of the HPD.

Further, the auxiliary channel may be used for data transmission of a USB device at DP v1.2 and for data transmission of an auxiliary device, such s a microphone and a camera.

Figure 5A:
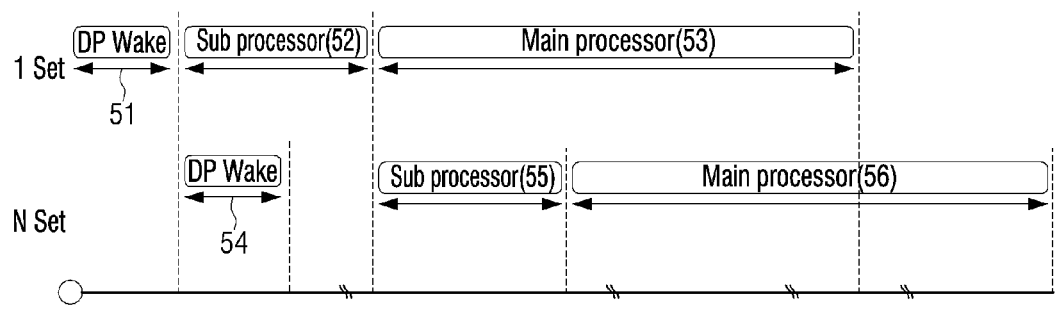
FIGS. 5A and 5B are diagrams explaining a process in which a display device constituting a video wall system according to an exemplary embodiment of the present disclosure operates to display an image as compared with that in the related art.
Figure 5B:
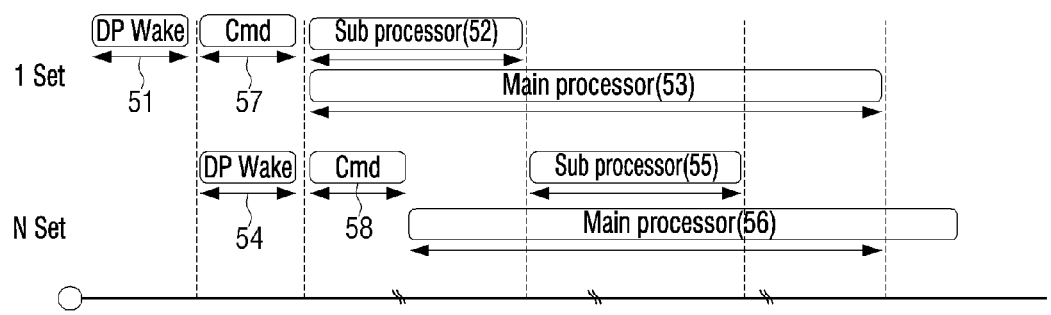

FIGS. 5A and 5B are diagrams explaining a process in which a display device constituting a video wall system according to an exemplary embodiment of the present disclosure operates to display an image as compared with that in the related art.

In FIGS. 5A and 5B, the term "1 Set" means any one display device among a plurality of display devices constituting a video wall system, and "N Set" means the N-th display device sequentially connected on the basis of "1 Set". In this embodiment, it is assumed that "1 Set" is the first display device that is directly connected to the source device 10, and "N Set" is the second display device that is directly connected to the output connector of the first display device.

FIG. 5A illustrates a process in which a display device is driven to display an image in a video wall system in the related art. First, the first display device may be switched over from a standby state to a wakeup state 51 in which the display device is switched over to a minimum operating state. In this case, a sub-processor 52 of the first display device may extract information that is necessary for the image processing by de-packaging and parsing the input image, and if the information is extracted, it transmits the parsed image to a main processor 53. In this case, the sub-processor 52 may make the second display device switched over to an operating state by transmitting the wakeup signal to the second display device in advance (54).

If the parsed image is received, the main processor 53 starts booting, and if the booting is completed, it generates an image corresponding to the first display device through processing of the image.

On the other hand, the sub-processor 52 transmits the parsed image to the main processor 53, and repackages the parsed image to transmit the repackaged image to the second display device. The second display device receives the image, extracts information that is necessary for image processing (55) through the sub-processor 55, and transmits the parsed image to the main processor 56. If the parsed image is received, the main processor 56 starts booting, and if the booting is completed, it generates an image corresponding to the second display device through processing of the image.

As described above, according to the video wall system in the related art, since the sub-processor and the main processor are sequentially driven, a lot of time is consumed for the image processing, and thus the video wall system is unable to rapidly display the image.

On the other hand, FIG. 5B illustrates a process in which a display device is driven to display an image in a video wall system according to an embodiment of the present disclosure.

First, the first display device may be switched over to a wakeup state (51). In this case, the first display device may make the second display device switched over to an operating state by transmitting the wakeup signal to the second display device in advance (54), and may transmit a booting command to the main processor 52.

Accordingly, while the sub-processor 52 performs processing, such as extracts the information that is necessary for the image processing by de-packaging and parsing the input image, the main processor 53 may be booted and enter into a standby state that is necessary for the image processing.

If the necessary information is extracted, the sub-processor 52 may transmit the parsed image to the main processor 53, and thus the main processor 53 may generate an image corresponding to the first display device by processing the image in a state where the booting is completed.

On the other hand, the sub-processor 52 transmits the parsed image to the main processor 53 and repackages the parsed image to transmit the repackaged image to the second display device. The second display device may receive the wakeup signal, and immediately transmit the booting command for booing the main processor 56. Thereafter, the second display device receives the image, extracts the information that is necessary for the image processing (55) by de-packaging and parsing the input image through the sub-processor 55, and if the necessary image is extracted, the sub-processor 56 may transmit the parsed image to the main processor 56. If the booting is completed in accordance with the booting command, the main processor 56 may generate an image corresponding to the second display device through processing of the image in a state where the booting is completed.

That is, according to an embodiment of the present disclosure illustrated in FIG. 5B, the sub-processor and the main processor are driven in parallel, and thus the corresponding image can be rapidly processed. That is, the display device wakes up and the main processor is booted in advance using the booting command at the same time, so that the time required for the booting of the main processor can be saved.

Figure 6:
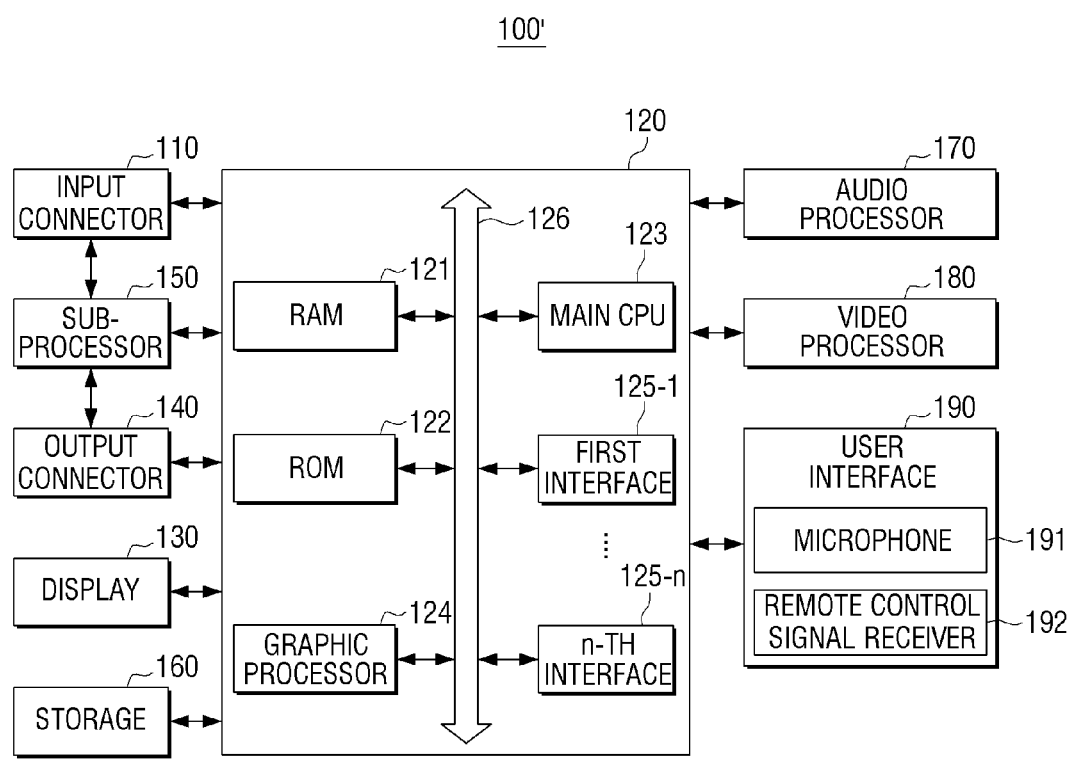
FIG. 6 is a block diagram illustrating in detail the configuration of a display device constituting a video wall system according to an exemplary embodiment of the present disclosure.

FIG. 6 is a block diagram illustrating in detail the configuration of a display device constituting a video wall system according to an exemplary embodiment of the present disclosure. As illustrated in FIG. 6, a display device 100' according to another embodiment of the present disclosure includes an input connector 110, a main processor 120, a display 130, an output connector 140, a sub-processor 150, a storage 160, an audio processor 170, a video processor 180, and a user interface 190. Hereinafter, explanation of the duplicate portions of FIG. 1 will be omitted.

The storage 160 is configured to store various modules for driving the display device 100'.

Specifically, the storage 160 may store a base module for processing signals transferred from respective pieces of hardware included in the display device 100', a storage module for managing a database or registries, a secure module, and a communication module. In particular, the storage 160 may store a parsing module for extracting information that is necessary for image processing by de-packaging and parsing the input image.

The audio processor 170 is a constituent element that processes audio data.

The video processor 180 is a constituent element that performs various image processes, such as input image decoding, scaling, noise filtering, frame rate conversion, and resolution conversion.

The user interface 190 is a constituent element to sense user interaction for controlling the whole operation of the display device 100'. In particular, the user interface 190 may include various interaction sensing devices, such as a camera (not illustrated), a microphone 191, and a remote control signal receiver 192.

The main processor 120 may control the whole operation of the display device 100' using various kinds of modules stored in the storage 160.

In the main processor 120 as illustrated in FIG. 6, a RAM 121, a ROM 122, a main CPU 123, a graphic processor 124, and first to n-th interfaces 125-1 to 125-n may be connected to one another through a bus 126.

The ROM 121 stores a set of commands for system booting. The main CPU 123 copies various kinds of application programs stored in the storage 160 to the RAM 121 and executes the application programs copied to the RAM 121 to perform various kinds of operations.

The graphic processor 124 generates a screen that includes various objects, such as icons, images, and texts, using an operator (not illustrated) and a renderer (not illustrated). The operator operates attribute values, such as coordinate values on which the respective objects are displayed according to a layout of the screen, shapes, sizes, and colors. The renderer generates the screen having various layouts including the objects on the basis of the attribute values operated by the operator.

The main CPU 123 accesses the storage 160 and performs booting using the OS (Operating System) stored in the storage 160. Further, the main CPU 123 performs various operations using various kinds of programs, content, and data stored in the storage 160.

The first to n-th interfaces 125-1 to 125-n are connected to the various kinds of constituent elements as described above. One of the interfaces may be a network interface connected to an external device through a network.

Figure 7A:
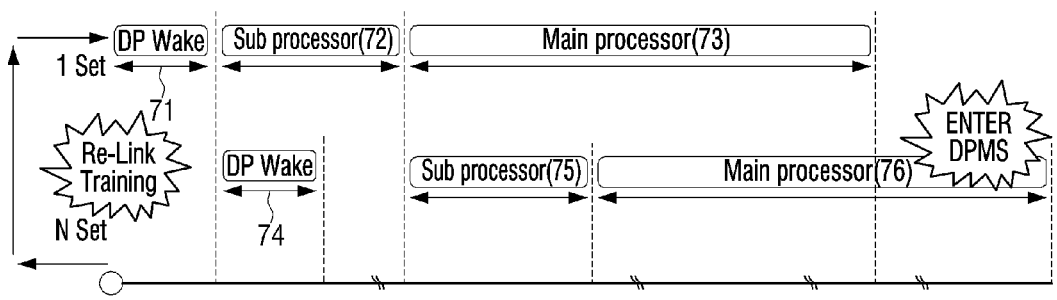
FIGS. 7A and 7B are diagrams explaining a panel-off mode of a display device constituting a video wall system according to an exemplary embodiment of the present disclosure as compared with a DPMS mode in the related art.
Figure 7B:
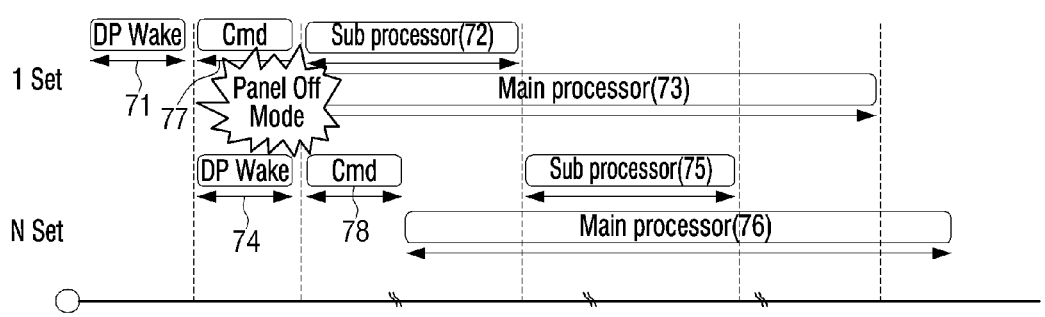

FIGS. 7A and 7B are diagrams explaining a panel-off mode of a display device constituting a video wall system according to an exemplary embodiment of the present disclosure as compared with a DPMS mode in the related art.

In FIGS. 7A and 7B, the term "1 Set" means any one display device among a plurality of display devices constituting a video wall system, and "N Set" means the N-th display device sequentially connected on the basis of "1 Set". In this embodiment, it is assumed that "1 Set" is the first display device that is directly connected to the source device 10, and "N Set" is the N-th display device that is sequentially connected on the basis of "1 Set".

FIG. 7A illustrates a process in which a display device performs re-link training when entering into a DPMS mode in a video wall system in the related art. First, if the N-th display device, which has not yet been turned on, enters into the DPMS mode in a state where a plurality of display devices constituting the video wall system are sequentially turned on, the N-th display device is not recognized, and thus the source device 10 performs re-link training. In this case, an image is re-input from the source device 10, and if such a problem occurs repeatedly, it takes a long time for the video wall system to normally operate. Accordingly, the display screen repeats on/off operation.

FIG. 7B illustrates a process in which a display device enters into a panel-off mode other than a DPMS mode in a video wall system according to an embodiment of the present disclosure.

If a predetermined time elapses in a state where the display device has no input signal, sub-processors 72 and 75 may transmit a command for making only a display panel of the display 130 operate in a panel-off mode in which only the display panel of the display 130 is turned off to main processes 73 and 76.

Specifically, as illustrated in FIG. 7B, the sub-processors 72 and 75 transmit a command for turning off the DPMS mode and making the display panel switched over to an off state to the main processors 73 and 76 together with a booting command.

Accordingly, the respective display devices constituting the video wall system operate in the panel-off mode in which only the display panel of the display is turned off other than entering into the DPMS mode. Accordingly, the video wall system can be rapidly driven, and thus the display screen can be prevented from being repeatedly turned on/off.

Figure 8:
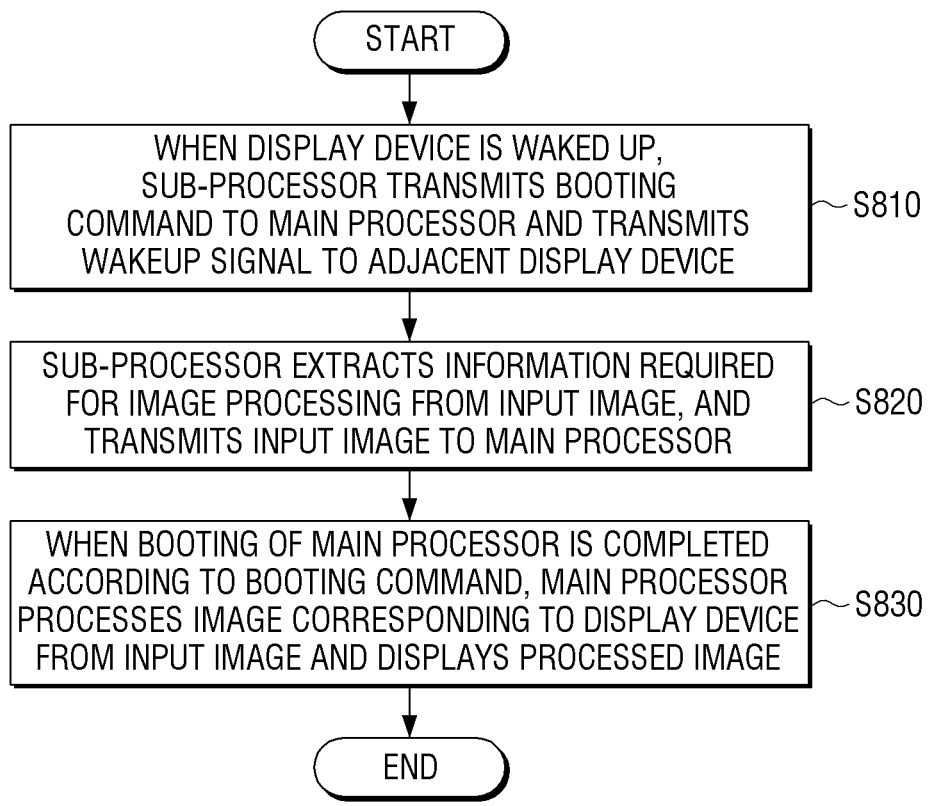
FIG. 8 is a flowchart illustrating a method for controlling a display device constituting a multi-display system according to an exemplary embodiment of the present disclosure.

FIG. 8 is a flowchart illustrating a method for controlling a display device constituting a multi-display system according to an exemplary embodiment of the present disclosure.

First, if a display device wakes up, a sub-processor transmits a booting command to a main processor and transmits a wakeup signal to an adjacent display device (S810).

Thereafter, the sub-processor extracts information that is necessary for image processing from an input image and transmits the input image to the main processor (S820). In this case, the sub-processor extracts information that is necessary for image processing by de-packaging and parsing the input image, transmits, if the parsing is completed, the parsed image to the main processor, repackages the parsed image, and transmits the repackaged image to the adjacent display device connected to an output connector. In this case, if the input image is not in a DP format (DVI or HDMI), the first display device that is directly connected to a source device may convert the input image into the DP format, and transmit the converted image to the adjacent display device.

Thereafter, if booting of the main processor is completed according to the booting command, the main processor processes an image corresponding to the display device from the input image and displays the processed image (S830). Further, the display device may exchange data for link management of the video wall system and for control of a plurality of display devices constituting the video wall system with the source device or the connected adjacent display device through an auxiliary channel. Further, if a predetermined time elapses in a state where the display device has no input, the display device can enter into a panel-off mode in which only the display is turned off.

As described above, according to various embodiments of the present disclosure, a rapid display can be implemented by waking up the display device constituting the multi-display system at high speed, and thus user's convenience can be improved.

The method for controlling a display device constituting a multi-display system according to various embodiments of the present disclosure may be implemented by a program and stored in various recording media. That is, a computer program that can execute the above-described various control methods through various kinds of processors may be stored in a recording medium to be used.

As an example, a non-transitory computer readable medium, which stores a program that includes a sub-processor transmitting, when the display device wakes up, a booting command to a main processor and transmitting a wakeup signal to an adjacent display device; the sub-processor extracting information that is necessary for image processing from an input image and transmitting the input image to the main processor; and the main processor processing, when booting of the main processor is completed according to the booting command, an image corresponding to the display device from the input image and displaying the processed image, may be provided.

The non-transitory computer readable medium is not a medium that stores data for a short period, such as a register, a cache, or a memory, but means a medium which semi-permanently stores data and is readable by a device. Specifically, the above-described programs may be stored and provided in the non-transitory computer readable medium, such as, a CD, a DVD, a hard disc, a Blu-ray disc, a USB, a memory card, and a ROM.

The foregoing exemplary embodiments and advantages are merely exemplary and are not to be construed as limiting the present disclosure. The present teaching can be readily applied to other types of apparatuses. Also, the description of the exemplary embodiments of the present disclosure is intended to be illustrative, and not to limit the scope of the claims, and many alternatives, modifications, and variations will be apparent to those skilled in the art.

Although a few embodiments have been shown and described, it would be appreciated by those skilled in the art that changes may be made in these embodiments without departing from the principles and spirit of the embodiments, the scope of which is defined in the claims and their equivalents.

What is claimed is:

1. A display device of a multi-display system, comprising:
    an input connector configured to receive an input image;
    a main processor configured to process an image corresponding to the display device from the input image;
    a display configured to display the processed image;
    an output connector configured to transmit the input image to an adjacent display device connected to the display device; and
    a sub-processor configured to transmit, when the display device wakes up, a booting command to the main processor, transmit a wakeup signal to the adjacent display device, obtain information necessary for image processing from the input image, and then transmit the input image to the main processor,
    wherein the sub-processor inactivates a DPMS (Digital Power Management Signaling) mode and transmits a command for operating the display device in a panel-off mode to the main processor, and
    wherein the panel-off mode is a mode to turn off only the display when a preset time elapses in a state where the display device has no input.

2. The display device as claimed in claim 1, wherein the sub-processor obtains the information necessary for the image processing by de-packaging and parsing the input image to produce a parsed image, transmits, when the parsing is completed, the parsed image to the main processor, repackages the parsed image as a repackaged image, and transmits the repackaged image to the adjacent display device.

3. The display device as claimed in claim 1, wherein the sub-processor converts the input image into a DP (Display Port) format to produce a converted image and transmits the converted image to the adjacent display device.

4. The display device as claimed in claim 1, wherein the input connector comprises an input connector of at least one of DP (Display Port), DVI (Digital Visual Interface), and HDMI (High Definition Multimedia Interface) types.

5. The display device as claimed in claim 4, wherein the input connector receives the input image from one of a source device and the adjacent display device connected through the input connector, and
    the sub-processor exchanges data for link management of the multi-display system and for control of a plurality of display devices constituting the multi-display system with the one of the source device and the connected adjacent display device through an auxiliary channel.

6. The display device as claimed in claim 1, wherein a wakeup of the display device is performed in at least one of a case where the wakeup signal is received through the input connector, a case where an AC power is input, a case where resolution of an input source is controlled, a case where the input source is changed, and a case where a DPMS (Digital Power Management Signaling) mode is released.

7. The display device as claimed in claim 1, wherein the main processor generates the device image corresponding to the display device in a manner where the main processor crops the input image into a plurality of image portions in accordance with a number of display devices constituting the multi-display system to produce cropped image portions, and scales the cropped image portions corresponding to a resolution of the display device.

8. A method for controlling a display device of a multi-display system, comprising:
    a sub-processor transmitting, when the display device wakes up, a booting command to a main processor and transmitting a wakeup signal to an adjacent display device;
    the sub-processor obtaining information necessary for image processing from an input image and transmitting the input image to the main processor; and
    the main processor processing, when booting of the main processor is completed according to the booting command, a device image corresponding to the display device from the input image to produce a processed image and displaying the processed image, wherein the method further comprises inactivating a DPMS (Digital Power Management Signaling) mode and transmitting a command for operating the display device in a panel-off mode to the main processor, wherein the panel-off mode is a mode to turn off only the display when a preset time elapses in a state where the display device has no input.

9. The method as claimed in claim 8, wherein the transmitting the input image to the main processor comprises:
obtaining the information necessary for the image processing by de-packaging and parsing the input image to produce a parsed image and transmitting, when the parsing is completed, the parsed image to the main processor; and
repackaging the parsed image as a repackaged image and transmitting the repackaged image to the adjacent display device.

10. The method as claimed in claim 8, further comprising converting the input image into a DP (Display Port) format producing a converted image and transmitting the converted image to the adjacent display device.

11. The method as claimed in claim 8, wherein the input image is input through an input connector of at least one of DP (Display Port), DVI (Digital Visual Interface), and HDMI (High Definition Multimedia Interface) types.

12. The method as claimed in claim 8, wherein the image is input from one of a source device and the adjacent display device connected to an input connector, and
the method further comprises exchanging data for link management of the multi-display system and for control of a plurality of display devices constituting the multi-display system with the one of the source device and the connected adjacent display device through an auxiliary channel.

13. The method as claimed in claim 8, wherein a wakeup of the display device is performed in at least one of a case where the wakeup signal is received through the input connector, a case where an AC power is input, a case where resolution of an input source is controlled, a case where the input source is changed, and a case where a DPMS (Digital Power Management Signaling) mode is released.

14. A method for controlling a display system of a multi-display system, comprising:
transmitting, by a first processor, a booting command to a second processor and transmitting a wakeup signal to an adjacent display system;
obtaining, by the first processor, information for image processing from an input image and transmitting the input image to the second processor; and
processing and displaying the input image, by the second processor, responsive to the information when booting of the second processor is complete,
wherein the method further comprises inactivating a DPMS (Digital Power Management Signaling) mode and transmitting a command for operating the display system in a panel-off mode to the second processor,
wherein the panel-off mode is a mode to turn off only the display when a preset time elapses in a state where the display system has no input.

15. A method, comprising:
serially waking display systems to serially display stream images by each of the systems by:
transmitting a wakeup command to a next display system by a sub-processor upon wakeup;
obtaining image processing information from an input image of a stream upon a boot driven wake-up initiated by the sub-processor;
performing image processing on the input image using the image processing information by a main processor after booting is complete; and
displaying the input image,
wherein the method further comprises inactivating a DPMS (Digital Power Management Signaling) mode and transmitting a command for operating each of the systems in a panel-off mode to the main processor,
wherein the panel-off mode is a mode to turn off only a display of display system when a preset time elapses in a state where the display system has no input.

16. A chained display method, comprising:
transmitting, by a first display system, a wakeup signal to a second display system as a boot command is issued in the first display system;
obtaining image processing information, by the first display system, from an input image during first display system booting; and
processing and displaying the input image, by the first display system, responsive to the image processing information after booting is compete,
wherein the method further comprises inactivating, by a first display system, a DPMS (Digital Power Management Signaling) mode and controlling the first display system operate in a panel-off mode to turn off only a display of the first display system when a preset time elapses in a state where the first display system has no input.

* * * * *